US005412420A

United States Patent [19]
Ellis

[11] Patent Number: 5,412,420
[45] Date of Patent: May 2, 1995

[54] THREE-DIMENSIONAL PHENOTYPIC MEASURING SYSTEM FOR ANIMALS

[75] Inventor: James S. Ellis, Broomfield, Colo.

[73] Assignee: Pheno Imaging, Inc., Broomfield, Colo.

[21] Appl. No.: 227,714

[22] Filed: Apr. 14, 1994

Related U.S. Application Data

[63] Continuation-in-part of Ser. No. 966,314, Oct. 26, 1992, abandoned.

[51] Int. Cl.⁶ ............................................. H04N 7/18
[52] U.S. Cl. .................................. 348/135; 348/552; 364/560; 364/564
[58] Field of Search ............... 348/135, 136, 140, 141, 348/552; 364/560, 561, 562, 563, 564; H04N 7/18

[56] References Cited

U.S. PATENT DOCUMENTS 4,745,472  5/1988  Hayes ................................. 348/141

OTHER PUBLICATIONS

"Linear Classification Program" brochure, published by Holstein Association, Brattleboro, Vernot in Sep. 1990.

Advertisement for a Perceptron Lasar Camera, published by Perceptron, Inc., Farmington Hills, Michigan, date unknown.

Primary Examiner—Howard W. Britton
Attorney, Agent, or Firm—James R. Young

[57] ABSTRACT

A system measures the three-dimensional phenotypic characteristics of an animal, such as a dairy cow. The system uses a large number of modulated laser light beams from a lidar camera to measure approximately 100 points per square inch of the animal. Each laser beam measures intensity, horizontal, vertical, and depth dimensions, and by combining the measurements, the system composes a very accurate three-dimensional image of the animal. The systems calculates the desired phenotypic measurements for conformation of the animal by combining measurements of selected points on the animal. The system then stores the measurements for each animal in a computer data base for later use. The system also stores a light intensity image of the animal's markings which is compared to other stored images.

25 Claims, 7 Drawing Sheets

THREE-DIMENSIONAL PHENOTYPIC MEASURING SYSTEM FOR ANIMALS

CROSS REFERENCE TO RELATED APPLICATIONS

This application is a continuation-in-part of application Ser. No. 07/966,314 filed Oct. 26, 1992 of James S. Ellis entitled "Three-dimensional Phenotypic Measuring System for Animals", abandoned.

FIELD OF THE INVENTION

This invention relates to a system for evaluating the physical characteristics of animals and more particularly to a laser system for three dimensional measuring. Even more particularly, the invention relates to projecting laser light toward an animal, measuring the reflection of the light from the animal, and using the measured light to develop a three-dimensional surface scan that can be used to measure both the linear and volume related characteristics of the animal.

BACKGROUND OF THE INVENTION

Throughout the history of the domestic livestock industry, mankind has attempted to measure animals, whether the need was to be taller, longer, thicker, leaner, wider or stronger, taking accurate measurements quickly has always been important. In modern times it has become more and more important to measure offspring of sires and compare those groups of offspring with like kind. Obviously, the sires that provide improved offsprings are in great demand and can provide the most improvement to a breed. Much of the future genetic progress will be attributed to our ability to improve the speed and accuracy of measuring animals.

We have evolved from measuring horses by using the approximate width of a hand; for example, a horse could be reported as 14 hands high which was about 56 inches. Currently some animals are measured at 15 different conformation points, however, most often the measurements are only visual appraisals, with even a tape measure being seldom used. Thus, there is tremendous need for more information and the improved accuracy of that information to accelerate breed progress.

One method of compiling data is shown in U.S. Pat. No. 4,745,472 issued May 17, 1988 to Hayes, entitled "Animal Measuring System". This method uses a video camera to take a picture of the animal, and then the picture is processed by a computer system to determine the measurements. Plastic patches were placed on several points of the animal, and measurements were made of only these points. Since this system uses a conventional video camera, it can only measure in two dimensions using a single camera. Thus, in addition to the camera measurement, additional hand measurements usually need to be made, or the data from several cameras must be coordinated. Coordination of the data from several cameras is a difficult task, requiring manual interpretation by a skilled operator.

It is thus apparent that there is a need in the art for an improved system which measures physical characteristics of an animal. There is further need in the art for such a system to measure in three dimensions. Another need is for such a system that does not require that patches be affixed to the animal before measuring. A still further need is for such a system that can measure in three dimensions using a single camera to provide both linear and volume measurements as well as improving the speed of measuring. The present invention meets these and other needs.

SUMMARY OF THE INVENTION

It is an aspect of the invention to measure physical characteristics of an animal.

It is another aspect of the invention to measure the physical characteristics using reflected laser light.

Still another aspect is to measure the physical characteristics in three dimensions from a single camera.

Accurate three-dimensional information can be collected from a single location using reflected laser light. A three dimensional image is created by projecting several laser light beams (signals) and measuring their reflection. One device for performing this function is a laser, or lidar, camera, such as the Lasar TM camera manufactured by Sumitomo Corporation. The laser camera projects hundreds of thousands of modulated laser signals to scan an area and measure the distance at each point between the camera and the surface of the animal, thus providing a total modeling of the animal surface. The camera can send 8 to 10 modulated laser signals to each linear inch of the surface of the animal, that is, 64 to 100 signals per each square inch of the animal, depending upon the distance between the camera and the animal. Using this camera, a pattern of laser beams measuring 1000 vertical and 1000 horizontal points are transmitted to the animal and their reflection returned to the camera in a very short time.

Because animals are symmetric, an image need only be taken of one side of the animal. Thus a single lidar camera at a single location provides all the three-dimensional information necessary for conformation of an animal. With some breeds, such as dairy cows, it may be necessary to use a second camera or take a second image of hidden areas; for example, a dairy cow may need a second image of the mammary system as viewed from the rear to provide additional accuracy for that portion of the animal.

A computer system selects the points of the animal desired for the conformation, measures the distance between these points to provide the conformation data, combines the selected conformation data for each animal with an identification number, and stores the conformation data and number for each animal. In addition, an image of the animal, showing the markings of the animal, may be stored along with the other conformation data.

The lidar camera and the computer that collects, supports and compiles the data can also be transported to any location, to provide a convenience for the animal owner. The camera can take an image of an animal which is standing in an open lot, housed in a box stall, standing in a stanchion, tied at halter or standing in a chute. When a chute is used, it is necessary to secure the animal by using plexiglass or a single bar on the side of the chute facing the lidar camera, and it may be appropriate to include a weighing device at the bottom of the chute to gather body weight as additional information.

A personal computer or lap top computer is used at an animal or farm location. With larger herds of cattle, however, a personal computer environment may not provide adequate memory, thus requiring a larger mainframe computer at a central office. In this environment, the camera information is transmitted to the mainframe computer via telephone lines using a modem. Either computer will collect and compile data from the lidar camera, however, a mainframe computer at a central office provides the capability of collecting a larger amount of information.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely to describe the general principles of the invention. The scope of the invention should be determined by referencing the appended claims.

Figure 1:
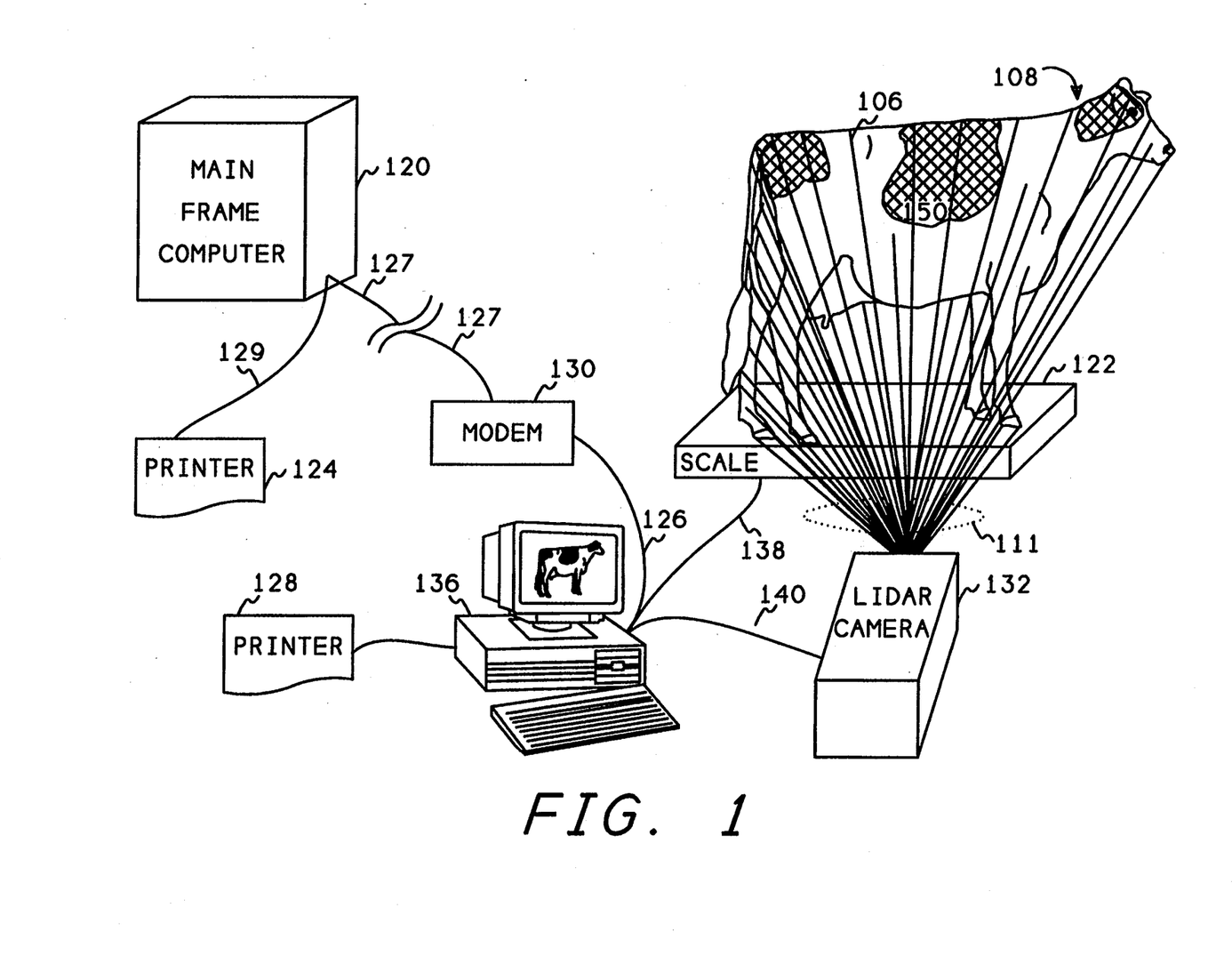
FIG. 1 shows a view of the present invention measuring and compiling data of an animal.

FIG. 1 shows the system of the present invention that measures three-dimensional phenotypic characteristics of an animal using a laser camera. One example of a laser camera is the Lasar TM camera manufactured by Sumitomo Corporation, 2-2 Hitotsubashi, 1-chome Chiyoda-ku, Tokyo, 100-91 Japan, and sold in the United States by Perceptron, Inc., 23855 Research Drive, Farmington Hills, Mich. 48335.

Referring now to FIG. 1, the animal 108 shown in FIG. 1 is a dairy cow, standing in front of the laser camera 132. The cow 108 can be free standing, tied, in a stanchion or in a chute. The camera 132 generates a detailed map of the entire animal within the scanned space assigning intensity and range values to each surface point that receives a laser signal. There are 64 to 100 surface points per square inch, depending upon the distance between the camera 132 and the animal 108, each point being generated by one of the laser signals 111. FIG. 1 does not contain sufficient detail to illustrate 64 to 100 surface points per square inch, so the lines 111 represent the number of modulated laser signals that would cover the entire animal (less the tail, which has no value in conformation).

An electrical source (not shown) provides electric power for the lidar camera 132, personal computer 136 and the printer 128. In a remote environment, this electrical source can be provided by a portable generator. Connecting data cable 140 transmits the information from the camera 132 to the personal computer 136. A telephone modem 130 and wires 126 and 127 transmit data from the personal computer 136 to a main frame computer 120 and back to printer 124. A local printer 128 could also be used to print the data.

When the horizontal, vertical and distance dimensions of two points on the animal are provided by the camera 132 measurements, then the difference between those two points can easily be computed. (See FIG. 2, FIG. 3, FIG. 5, FIG. 6, and FIG. 7 and the description below for more information on these calculations.) By measuring hundreds of thousands of points on the animal, the system calculates hundreds of different measurements with an accuracy of approximately one-tenth (1/10th) of an inch. The system also calculates the volume of the barrel and mammary system of the animal. One particular advantage of the laser measurements is that the system can calculate the distance to the animal, thus avoiding inaccuracies of prior art camera systems when the animal is placed at an incorrect distance from the camera. Prior art visual measuring systems that do not use a camera are not as accurate and can only evaluate about 90 to 100 animals per day. The present invention can measure approximately 50 animals per hour.

A scale 122 can be placed under the animal to weigh the animal. The weight of the animal is sent to the computer system 136 via wiring 138 and stored with the conformation data.

The camera used in the present invention, or other types of three-dimensional scanning means, can record the scanned image with several levels of light intensity represented by gray scale values for each point scanned. For example, the Lasar TM camera discussed above provides 4096 levels of light intensity represented by shades of gray for each point. These gray scale levels allow the image to distinguish markings on the animal. This is particularly effective for cattle, such as Holstein cattle, which have black and white markings. These markings are similar to fingerprints in that no two cows have the same markings. By storing the photographic image of the animal along with the conformation data, the animal can be positively identified using a computer. The image of the animal and the conformation data can be printed on the printer 128 or printer 124 to ensure positive correlation between the particular animal and its conformation data.

In addition, the computer system 120 or 136 stores this data for each group of animals processed, and can scan the data bank for each new animal to ensure that the same animal is not processed more than once. This prevents mistake or fraud when taking measurements, and can identify stolen animals. Also, this relieves the owner of the animal from the tedious task of sketching the markings, if such a sketch is required to register the animal.

Some methods of branding an animal allow the brand to be readily distinguished. For example, freeze branding eliminates pigment under the animal's skin allowing the branded area to grow only white hair. An example of this numbering is shown in FIG. 1. This is used to brand a number on the animal that is easily distinguished. By branding the animal using easily recognized numbers, such as optical character recognition numbers, the lidar camera can convert the brand into a computer readable number used to positively identify the animal anytime conformation data is measured.

Figure 2:
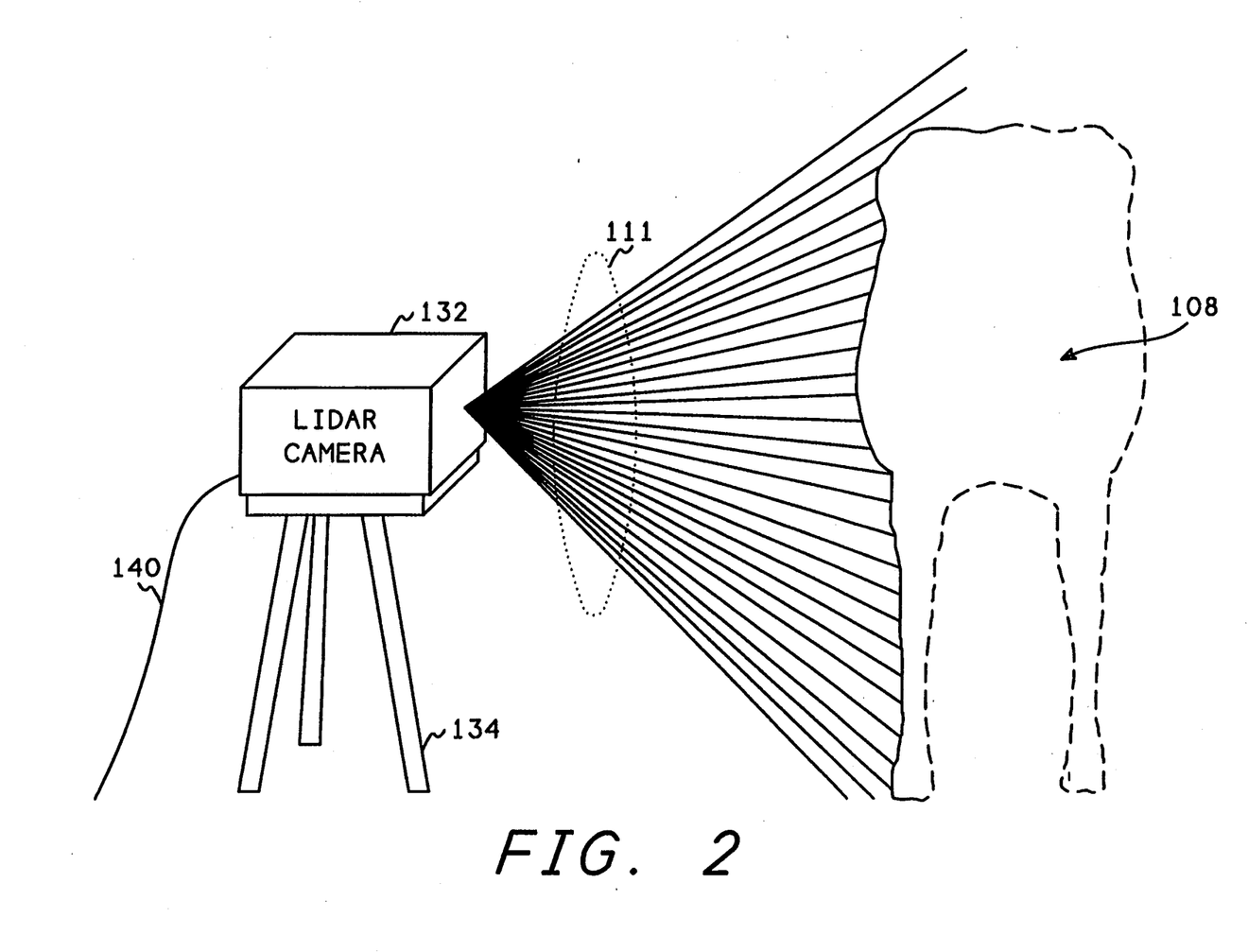
FIG. 2 shows a single linear latitude cross section (horizontal end view) of an animal to illustrate a portion of the image process of laser signals.

FIG. 2 shows a side cross section view of the animal along with the measuring system to illustrate the three-dimensional measurements of the animal. Referring now to FIG. 2, the animal is shown with the side away from the camera 132 in dotted lines. The camera 132 scans a line of the animal from the top of the animal, i.e. 106 of FIG. 1, to the floor or ground. This example helps visualize the concept of the modulated laser signals 111 as they measure distance to each surface point.

Figure 3:
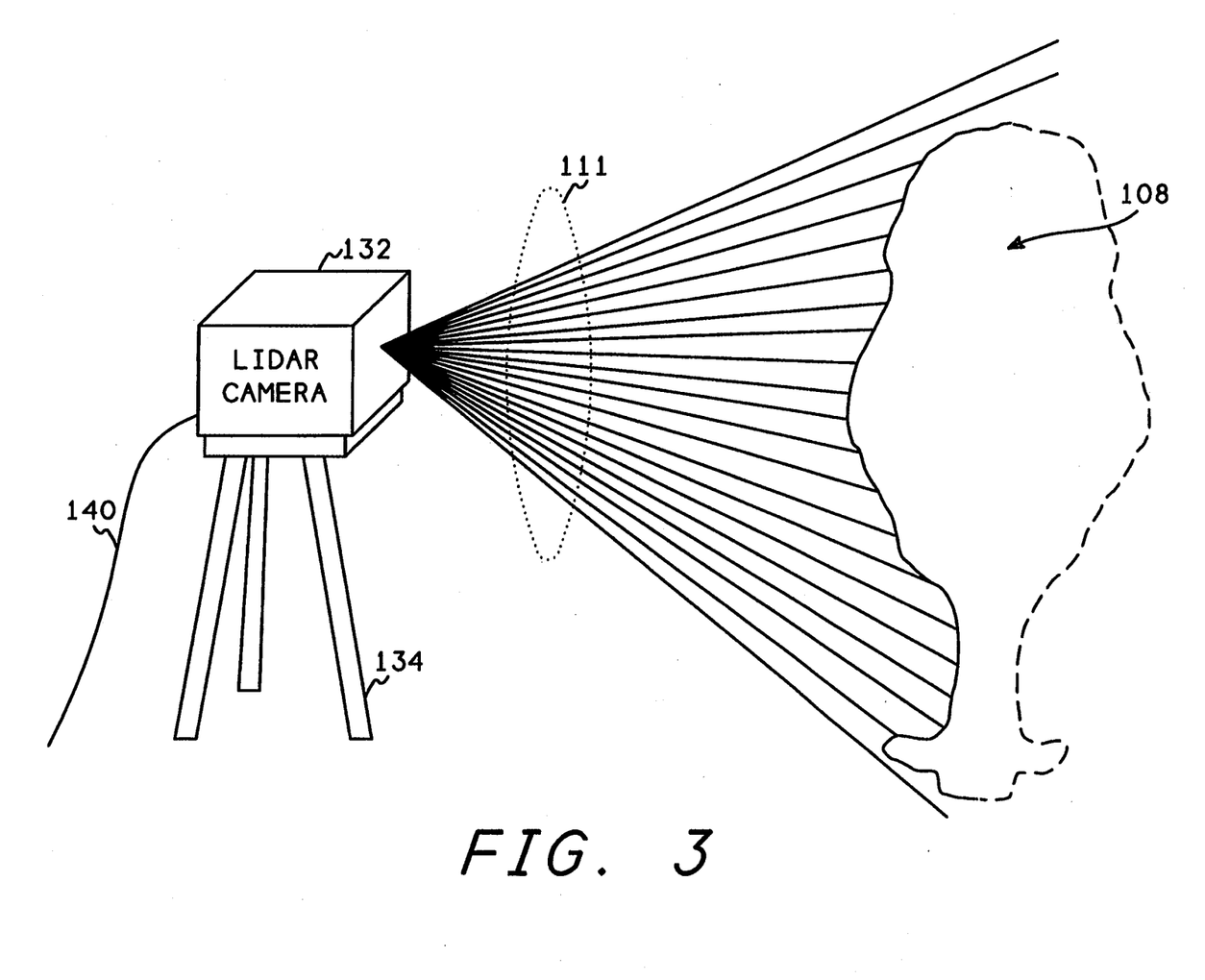
FIG. 3 shows a single linear longitude cross section (overhead view) of an animal to illustrate a portion of the image process of laser signals.

FIG. 3 shows a top view of the animal and the laser signals 111, wherein the side of the animal opposite the camera 132 is shown in dotted lines. Referring now to FIG. 3, the camera 132 scans a line of the animal from the front of the body of the animal to the rear of the animal 108 in FIG. 3. This example helps visualize the concept of the modulated laser signals 111 as they measure the distance to each point on the animal.

Figure 4:
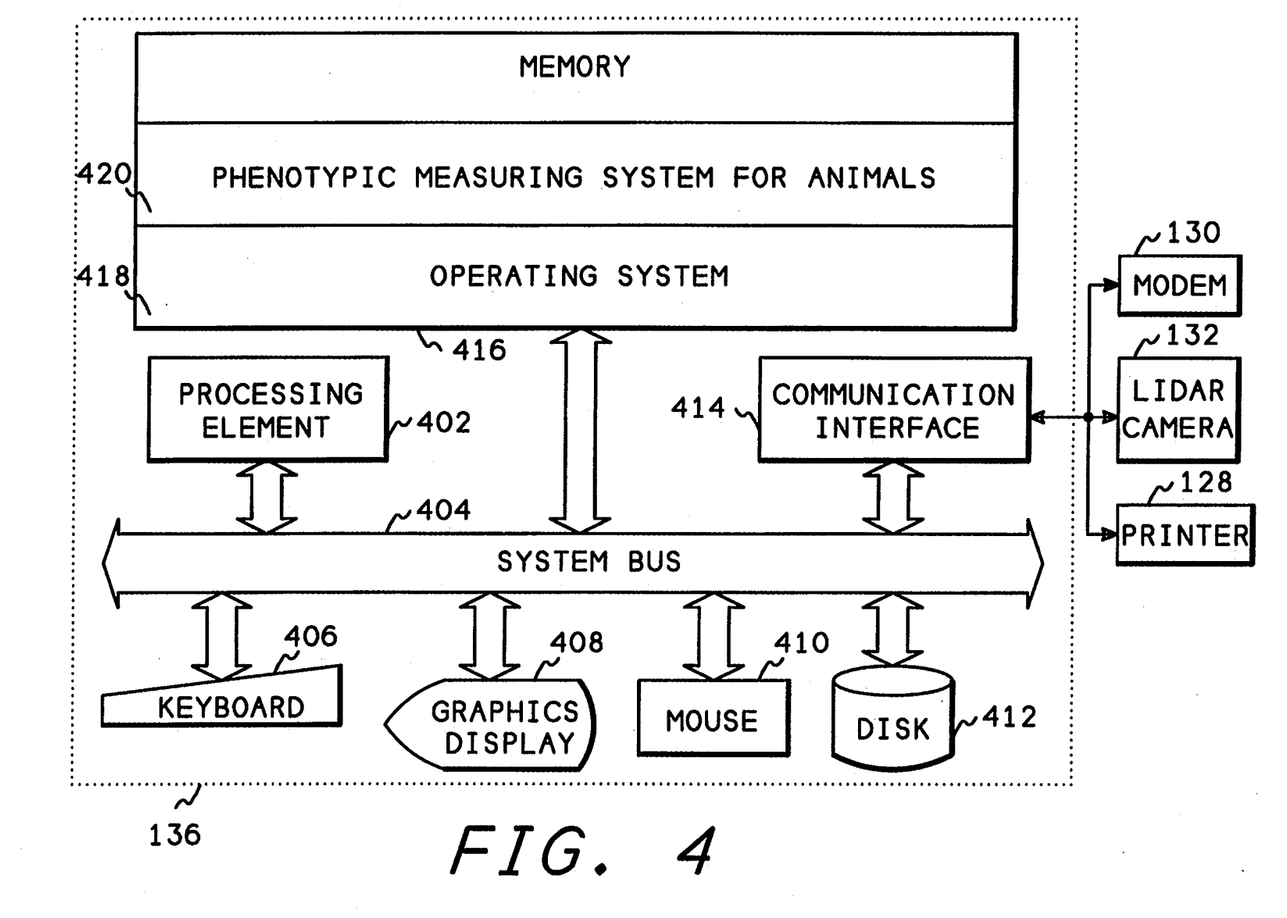
FIG. 4 shows a block diagram of the present invention.

FIG. 4 shows a block diagram of a computer system and the laser camera of the present invention. Referring now to FIG. 4, the computer system 136 contains a processing element 402. The processing element 402 communicates to the other elements of the computer system 136 over a system bus 404. A keyboard 406 and a laser camera 132 allow input to the computer system 136. A mouse 410 provides input for locating specific points on the image of the animal as displayed on graphics display 408, which also provides a display of any other information to be viewed by a user of the computer system 136. A printer 128 allows for output to paper to be viewed by a user of the computer system 136. A disk 412 stores the software and data used by the system of the present invention, as well as an operating system and other user data of the computer system 136.

A memory 416 contains an operating system 418, and an application program 420, a phenotypic measuring system for animals. Those skilled in the art will recognize that the operating system 418 could be one of many different operating systems, including many windows-type operating systems, and that many application programs could be performing in a multi-tasking operating system.

Figure 5:
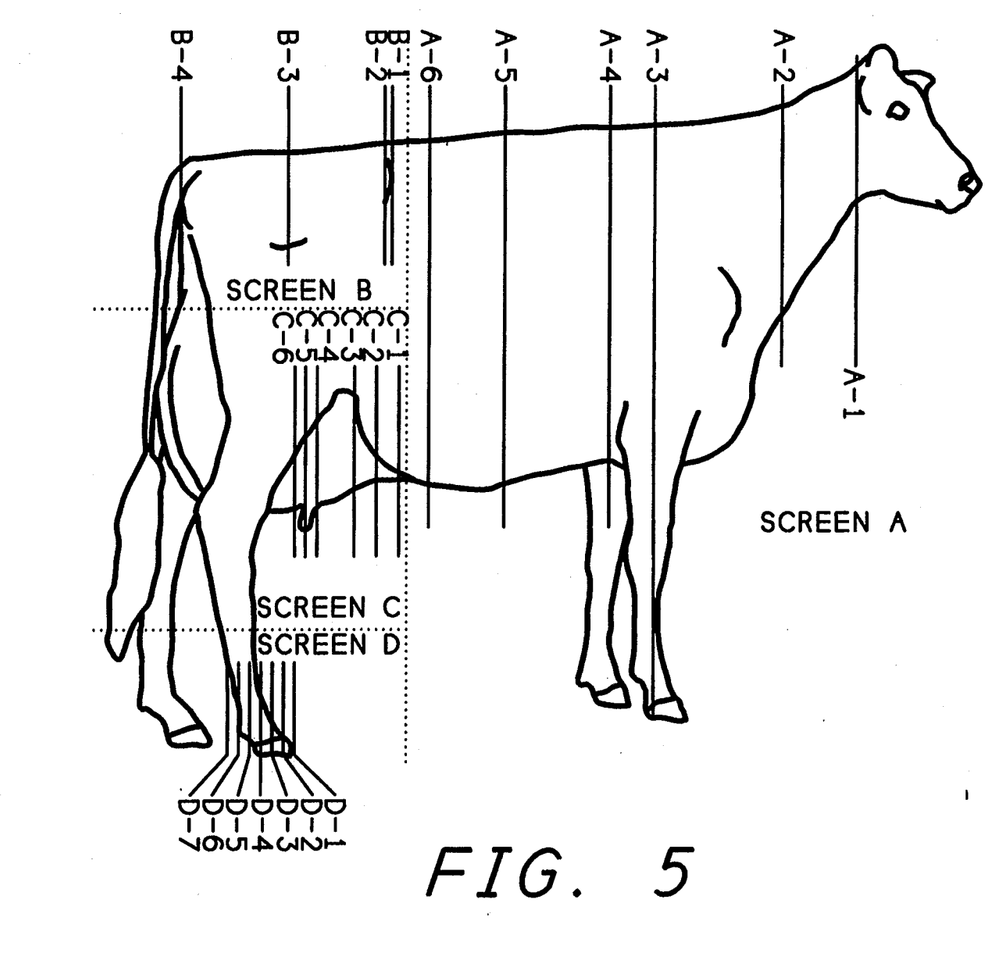
FIG. 5 shows a side view of an animal indicating points to be located.

FIG. 5 shows a screen display of side view of an animal indicating points to be located. FIG. 5 divides the view of the animal into four regions or screens. Screen A contains the front two thirds of the animal. Screen B contains the pelvic (rump) structure, Screen C contains the mammary system, and Screen D contains the hind hoof and leg alignment information. The laser camera 132 in FIG. 1 records numerous points containing the horizontal (X coordinate) and vertical (Y coordinate) positions in the picture frame, and the distance (Z coordinate) from the camera at that point. The animal image is loaded into a two dimensional array, where each X, Y location contains the Z value, the distance from the camera information.

The measuring techniques used in FIG. 5 (and also FIG. 7) are calculated by linear, angular or volummetric means. There are currently 15 conformation traits that are measured for Holstein Cows. After each trait is measured by the system, it is then converted to a scale of 1 to 50. Known as rating of each trait, this conversion to a scale of 1 to 50 compares each cow measured to those represented within the biological extremes of the breed.

Eleven of the traits use the higher ratings to represent positive biological extremes and lower ratings to represent negative biological extremes. In a non-selected large population of dairy cows the ratings will produce a bell shaped curve with very few animals at the extremes and a large portion of the animals rated closer to the breed average rating of 25.

An example of the rating of a single trait would be stature which is measured from the ground to the top of the withers. For example, in FIG. 5, Screen A, the top of slice A-3. Cows 51 inches or under are extremely short and receive 5 points or less. Those which are 55 inches are average and given 25 points. Cows that are 59 inches or taller receive 45 points or more.

Four of the 15 conformation traits that are measured use a rating of 25 (breed biological average) as the best rating. These four conformation traits are rump angle, rear leg angle, foot angle and teat length. In these traits both of the biological extremes are negative to the breed or breed improvement. An example of the rating of one of these traits would be teat length in FIG. 5, Screen C, slice C-5. A teat length of 2 to 2½ inches is most desirable and is rated 25 points. A teat length of less than one inch is not desirable and is rated 5 points or less. Likewise, the other biological extreme of the teat length is excess of 4 inches is undesirable and is rated 45 to 50 points.

Referring now to FIG. 5, the hip bone of the animal on slice B-1 on FIG. 5 is manually designated using the mouse 410 (FIG. 4), a tracer beam (a single beam of lighting used as the animal is being pictured), or other pointer on the computer screen. This manually designated point is the starting point for all the other locations on the animal.

The hip bone is initially used to position each animal's image uniformly 10 feet from the camera. This way all animals can be consistently compared. If the hip bone, which is indicated by using the mouse as described above, is not 10 feet from the camera, the whole image of the animal is appropriately adjusted, as shown by the pseudo code in Table 1. The hip bone is the nearest point to the camera along the B-1 slice of FIG. 5.

TABLE 1

If the hip bone 106 in FIG. 1 is less than 10 feet from the laser camera 132 in FIG. 1,
  increase the hip bone distance, the Z coordinate, by the difference between the hip bone and 10 feet;
  increase all the other distance coordinates in the image by the difference between the hip bone and 10 feet;
  then adjust all the X (horizontal length) and Y (vertical height) coordinates appropriately to reduce the image;
else, if the hip bone 106 in FIG. 1 is more than 10 feet from the camera 132 in FIG. 1,
  decrease the hip bone distance, the Z coordinate, by the difference between the hip bone and 10 feet;
  decrease all the other distance coordinates in the image by the difference between the hip bone and 10 feet;
  then adjust all the X (length) and Y (height) coordinates appropriately to enlarge the image.
Save these hip bone coordinates as the reference point on the B-1 slice of FIG. 5 for later use.

Those skilled in the art will also recognize that the distance of the animal from the camera could also be measured from the backbone. As will be discussed below, the top of the animal, or backbone, can be determined at two different locations as the top of slice A-1 and the top of slice A-4. These two locations could be used to determine the line of the backbone, and this line could then be used to position the animal at the correct distance, and to adjust the front or rear of the animal so that the line of the backbone is perpendicular to the camera beam that traces the center of the animal.

Alternatively, each point along the top of the animal between slices A-1 and A-4 could be ascertained (as will be discussed below) and these points could be formed into a line using the technique of least squares analysis. Then this line could be used as described above.

After the image of the cow is scaled to the desired distance and size, the location of measurement points are determined. The A-6 slice on FIG. 5 is one position in front of the hip bone. This slice is used to find the top and bottom of the body, and the changes in distance from the camera along this line can also be used to determine the volume of the animal at this location. The following Table 2 describes how to find all the points along the A-6 slice in FIG. 5.

TABLE 2

Increment the X (length coordinate of the hip bone B-1
 in FIG. 5 by one unit. (A unit may be one
 tenth of an inch, one half inch, one inch,
 etc. with out changing the logic.)
Repetitively increment the Y (height) coordinate from
 the hip bone height while keeping the X
 (length) coordinate constant,
 Until the Z (distance) coordinate increases by at
  least 2% over the last Z coordinate between
  two consecutive Y (height) coordinates. (If
  the animal is 10 feet from the camera, 2% of
  this distance is approximately two and one
  half inches. Two percent of the distance from
  the camera will vary across the animal because
  the animal is not flat.)
Decrement the Y (height) coordinate once to return to
 the body. The animal's back has been reached.
 Save the X, Y, and Z coordinates of the top of
 the A-6 slice on FIG. 5.
Return to the hip bone height.
Repetitively decrement the Y (height) coordinate by one
 from the hip bone while keeping the X (length)
 coordinate constant,
 Until the Z (distance) coordinate increases by at
  least 2% over the last Z coordinate between
  two consecutive Y (height) coordinates.
Increment the Y (height) coordinate once to return to
 the body. The underside of the body has been
 reached.
 Save the X, Y, and Z coordinates of the bottom of the A-
 6 slice on FIG. 5.

Most of the locations on the animal are found relative to some perimeter conditions. The following pseudo code in Table 3 describes how to follow the edge of the animal from whatever view is being used. This section of pseudo code must be given a starting point (X,Y,Z), the predominant direction for both X (length) and Y (height), and the terminating conditions, such as an abrupt change in Z (distance) coordinate, generally 2% or greater, along the X or Y axis in the predominant direction (some obstacle was found or animal does not continue in that direction) or the ground has been found. As the leg and hoof approach the ground the changes in the Z (distance) coordinate are less pronounced than on the rest of the animal. The pseudo code in Table 3 is referenced many times in the following tables.

In the following pseudo code Table 3, the starting point is the top of the A-6 slice in Screen A of FIG. 5 that was located in Table 2. Both the X (length) and Y (height) coordinates will predominantly increase, until the Z (distance) coordinate is abruptly decreases between two X (length) coordinates. After performing the pseudo code of Table 3 along the back of the animal from the top of the A-6 slice, the animal's ear, or the head lock or stanchion holding the animal will be reached.

TABLE 3

Starting from a point on the animal that is provided.
Loop A - Increment the primary coordinate, this can be
 the X (length) or Y (height) coordinate, in
 the predominate direction by one.
 If this point includes a Z (distance) coordinate
  within 2% of the last Z coordinate, this
  point is still on the animal. Save this
  point (X, Y, and Z) as the new animal
  coordinate.
  Loop B - Vary the X (length) and Y (height),
   in one tenth inch increments around
   the new animal coordinate up to one
   half inch out from the new animal
   coordinate looking for the largest
   change in the Z coordinate between
   two consecutive X or Y coordinates.
   If the largest change in Z
    coordinate is at least 2% greater
    than the last Z coordinate, the edge
    of the animal runs between this
    point and the last point tested.
    Save the last point tested and
    return to Loop A. A change,
    generally two inches or more, in Z
    indicates that a point is on some
    object other than the current edge
    of the animal. However, as the leg
    and hoof approach the ground the
    change in the Z coordinate becomes
    much smaller. If X is the primary
    coordinate, Y must be varied all the
    way around each X coordinate to find
    the greatest change in the Z
    coordinate. When no significant
    (i.e. less than one quarter inch)
    change in Z can be detected, the
    ground has been reached. Save the
    last point on the animal and exit
    the function.
  End of Loop B.
 Else, this point is off the animal. Return to the
  previous point on the animal.
  Increment the non-primary coordinate, this can
   be the X (length) or Y (height)
   coordinate, in its predominate
   direction by one.
  If this point includes a Z (distance)
   coordinate within 2% of the last Z
   coordinate, this point is still on
   the animal. Save this point (X, Y,
   and Z) as the new animal coordinate.
   Perform Loop B.
  End If.
 End If.
Repeat Loop A.

The top of A-1 slice on FIG. 5 was located using the pseudo code shown in Table 3. The A-1 slice in Screen A of FIG. 5 is one of the reference points needed on the animal. Also, this slice helps evaluate the confirmation of the animal. Table 4 describes the pseudo code needed to follow the A-1 slice across the neck of the animal.

TABLE 4

Start from the top of the A-1 slice.
Repetitively decrease the Y (height) coordinate, while
 keeping the X (length) coordinate constant,
 Until the Z (distance) coordinate increases by at
  least 2% over the last Z coordinate between
  two consecutive Y (height) coordinates. The
  bottom of the neck has been reached.
Increase the Y (height) coordinate by one to re-
 locate the neck.
Save this point as the bottom of the A-1 slice in
 FIG. 5.

After the top and bottom of the A-1 slice are identified, the near front leg must be found. Use the pseudo code in Table 3 to move along the bottom of the neck. Start from the bottom of the A-1 slice in Screen A of FIG. 5 found in Table 4, and both the X (distance) and Y (height) coordinates will predominantly be reduced, until the Z (distance) coordinate is abruptly reduced when the near upper leg is reached. Save the first point located on the near upper leg. This point is used to call Table 3 again.

Again use the pseudo code in Table 3 to move down the near front leg until the ground is located. Start from the first point located on the near upper leg, reduce the Y (height) and X (length) coordinates until no significant change in Z (distance) can be detected. The ground at the front of the near front leg has been reached.

The back of the near front leg must be detected to identify the bottom of the A-3 slice. Since the edge of the animal can not be detected when it merges with the ground, use Table 3 to move back up the front of the near front leg until the Y (height) coordinate increases by two inches. Start from the last point identified on the animal when moving down the front of the near front leg, the Y (height) coordinate will be predominantly increased and the X (length) coordinate will be predominantly reduced, until the Y (height) coordinate has been increased by two inches from the starting point.

Table 5 contains the pseudo code needed to move across the near front leg to the back of that leg two inches above the ground. The back of the near front leg is detected by an abrupt change in the Z (distance) coordinate.

TABLE 5

Repetitively decrease the X (length) coordinate, while keeping the Y coordinate constant,
Until the Z (distance) coordinate increases by at least 2% over the last Z (distance) coordinate between two consecutive X coordinates.
Increase the X (length) coordinate by one to move back to the animal. The back of the front foot has been reached.

In order to find the bottom of the A-3 slice in Screen A of FIG. 5, the ground under the back of the near front leg must be located. This is done by using the pseudo code in Table 3. The starting point is the back of the front leg located in Table 5. The Y (height) coordinate is predominantly reduced and the X (length) coordinate is predominantly increased, until no significant change in the Z (distance) coordinate can be detected in any direction. Save the point just prior to when no distance change could be detected as the bottom of the A-3 slice in Screen A of FIG. 5.

The horizontal distance between the X (length) coordinate of the A-1 slice and A-3 slice determines the length of the neck of this animal and is rated.

The A-3 slice is used as a reference point and the coordinates along this line are used to grade the strength and dairy form of the animal, as shown by the pseudo code of Table 6. The top of the A-3 slice determines the stature of the animal and is rated.

TABLE 6

Start from the bottom of the A-3 slice in Screen A of FIG. 5.
Repetitively increase the Y (height) coordinates while keeping the X (length) coordinate constant,
Until the Z (distance) coordinate increases by at least 2% over the last Z coordinate between two consecutive Y (height) coordinates, and the Y coordinate is within six inches of the height of the animal at the top of the A-6

TABLE 6-continued slice in FIG. 5.
Decrease Y (height) by one coordinate, and save the X, Y, and Z coordinates as the top of the A-3 slice in FIG. 5.
The difference between the Y (height) coordinate at the top of the A-3 slice and the bottom of the A-3 slice provides the stature of the animal.
Compare all the Z (distance) coordinates along the A-3 slice with the optimum cow coordinates to provide a rating of the current A-3 slice on strength and dairy form of this animal.

The A-2 slice in Screen A of FIG. 5 is also used to determine the strength and dairy form of the current animal. The A-2 slice is 60% of the way between the X (length) coordinates of the A-3 slice, and the A-1 slice. The pseudo code in Table 7 shows the rating of A-2 slice.

TABLE 7

Use the X (length) coordinate of the A-1 slice and the A-3 slice to determine 60% of the distance from A-3 to A-1.
This is the X (length) coordinate of the A-2 slice in FIG. 5.
Use the Y (height) coordinate of the top of the A-3 slice and the new X (length) coordinate for the A-2 slice.
Repetitively increase the Y (height) coordinate, while keeping the X (length) coordinate constant,
Until the Z (distance) coordinate increases by at least 2% over the last Z coordinate between two consecutive Y (height) coordinates.
Decrease the Y (height) coordinate by one to return to the neck of the animal.
Save this point as the top of the A-2 slice in Screen A of FIG. 5.
Repetitively decrease the Y (height) coordinate, while keeping the X (length) coordinate constant.
Until the Z (distance) coordinate increases by at least 2% over the last Z coordinate between two consecutive Y (height) coordinates.
Increase the Y (height) coordinate by one to return to the bottom of the neck.
Save this point as the bottom of the A-2 slice in Screen A of FIG. 5.
Compare the Y (height) and Z (distance) coordinates along the A-2 slice with an optimum A-2 slice and rate the current A-2 slice for strength and dairy form. The points along the A-2 slice can be formed into a curve using the technique of least squares analysis, and the radius of the curve can be rated.

The A-4 slice in Screen A of FIG. 5 also determines the strength and dairy form of the animal. To locate the A-4 slice begin at the bottom of the A-6 slice identified in Table 2 and use the pseudo code in Table 3 to move forward until the near front leg is found, then move back off the leg. Start from the bottom of the A-6 slice. Both the X (length) and Y (height) coordinate will predominantly increase, until the Z (distant) coordinate is abruptly reduced to locate the near front leg. Since the A-4 slice in Screen A of FIG. 5 is behind the point of the elbow of the near front leg, call Table 3 to move back two inches. Start from the point just behind the near front leg on the animal. Both the X and Y coordinates will predominantly decrease until X has reduced by two inches from the back of the near front leg. This identifies the bottom of the A-4 slice in Screen A of FIG. 5.

The A-4 slice followed from the bottom to the top of the animal and rated in Table 8.

TABLE 8

Repetitively increase the Y (height) coordinate, while
  keeping the X (length) coordinate constant,
  Until the Z (distance) coordinate increases by at
    least 2% over the last Z coordinate between
    two consecutive Y (height) coordinates.
Decrease the Y (height) coordinate by one to return
  to the back.
Save this point as the top of the A-4 slice in FIG.
  5.
Compare the Z coordinates along the A-4 slice with an
  optimum A-4 slice and grade the current A-4
  slice.
Subtract the bottom Y (height) coordinate of the A-4
  slice from the top of the A-4 slice to
  determine the body depth of the animal.

Only the A-5 slice on FIG. 5 remains to be identified on Screen A. The A-5 slice is 50% of the way between the A-6 slice and the A-4 slice. The A-5 slice is used to determine the body depth and strength of the current animal. The coordinates along the A-5 slice are compared with optimum measurements for these two traits and the current animal is given a grade. Table 9 describes how the A-5 slice is located and rated.

TABLE 9

Use the X (length) coordinates of the A-6 slice and the
  A-4 slice to calculate 50% of the distance
  between the A-6 and A-4. This provides the X
  (length) coordinate for the A-5 slice on FIG.
  5.
Start with the X (length) coordinate for A-5 and the Y
  (height) coordinate of the hip bone.
Repetitively increase the Y (height) coordinate, while
  keeping the X (length) coordinate constant,
  Until the Z (distance) coordinate increases by at
    least 2% over the last Z coordinate between
    two consecutive Y (height) coordinates.
Decrease the Y (height) coordinate by one to return
  to the back.
Save this point as the top of the A-5 slice in FIG.
  5.
Repetitively decrease the Y (height) coordinate, while
  keeping the X (length) coordinate constant,
  Until the Z (distance) coordinate increases by at
    least 2% over the last Z coordinate between
    two consecutive Y (height) coordinates.
Increase the Y (height) coordinate by one to return
  to the animal.
Save this point as the bottom of the A-5 slice in
  FIG. 5.
Compare the Y (height) and Z (distance) coordinates
  along the A-5 slice with an optimum A-5 slice
  and grade the current A-5 slice.
Subtract the bottom Y (height) coordinate of the A-5
  slice from the top of the A-5 slice to
  determine the body depth of this animal at
  this location and the body depth is rated.

Figure 6:
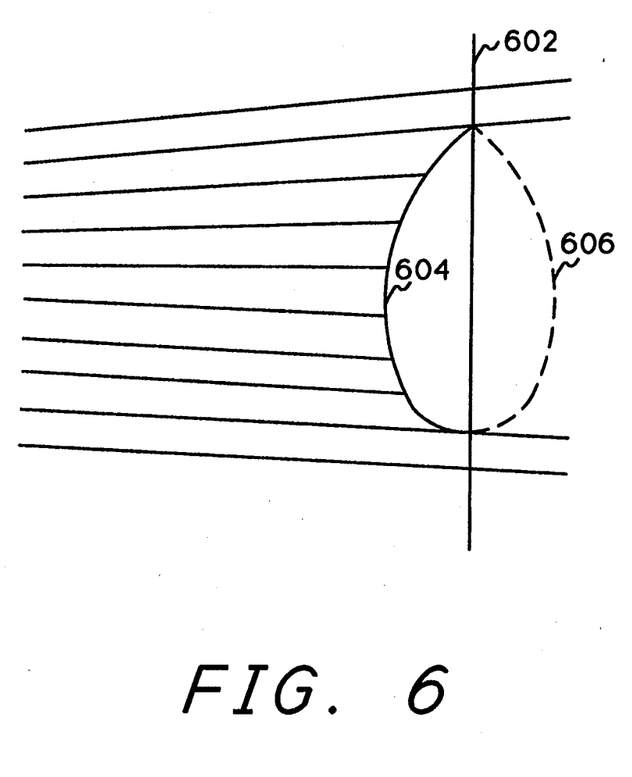
FIG. 6 shows a single linear longitude cross section (vertical slice) of an animal to illustrate part of the image process of laser signals.

All the slices on Screen A of FIG. 5 have been identified and evaluated. FIG. 6 shows the A-4 slice from Screen A, FIG. 5 from the front. The solid line shows the Y (height) and Z (distance) coordinates from the near side of the animal. The dashed line shows the far side of the animal as a mirror image. The cow's backbone 402 is used as the center of the cow. All the slices which extend from the top to the bottom of the cow can be represented this way and used to calculate and rate the volume of the cow. Table 10 shows how these points are determined. After the circumference of the slice is identified, assume the slice is one inch thick, and calculate the volume of that slice in square inches. One inch thick, along the X axis, slices from A-4 to A-6 can be calculated and used to determine the volume of this animal.

TABLE 10

Start with the A-4 coordinates.
The Z (distance) coordinate at the top 602 of the A-4
  slice defines a line down the center of the
  animal.
Repetitively decrease the Y (height) coordinate and
  subtract the Z (distance) coordinate for that
  point along the side of the animal 604 from
  the center distance 602. This gives width of
  one side of the animal.
Add this width to the center Z (distance)
  coordinate along the same Y (height)
  coordinate to determine the dimensions of the
  far side of the animal at point 606.
Continue down the side of the animal until the Z
  distance increases by 2% between two
  consecutive Y (height) coordinates.

Return to the hip bone on slice B-1 in FIG. 5 to begin evaluating Screen B. Screen B extends from the hip bone to the pin bone B-4 on FIG. 5 and down 23% of the distance between the hip bone height and the ground. Screen C extends from the hip bone to the rear of the animal, excluding the tail, and from bottom of Screen B down 75% of the height from the hip bone to the ground.

Use Table 3 to locate the ground under the front of the near hind leg D-1 on FIG. 5. The search for the ground begins from the bottom of the A-6 slice. The Y (height) coordinate predominantly decreases and the X (length) coordinate varies, until the Z (distance) coordinate has not significantly change. The last point identified on the edge of the animal is saved as the D-1 location in Screen D of FIG. 5.

Use the pseudo code in Table 11 to locate the two lines separating Screen B, Screen C, and Screen D.

TABLE 11

Use the Y (height) coordinate of the hip bone and the Y
  coordinate of the ground at D-1 to determine
  23% of the distance from the hip bone to the
  ground.
This new Y (height) coordinate is the bottom of Screen B
  in FIG. 5.
Use the Y (height) coordinate of the hip bone and the Y
  coordinate of the ground at D-1 to determine
  75% of the distance from the hip bone to the
  ground.
This new Y (height) coordinate is the bottom of Screen C
  in FIG. 5.

In order to find the pin bone and the rear of the animal, start from the hip bone and increase the Y (height) coordinate to find the back of the animal. Pseudo code for this is shown in Table 12.

TABLE 12

Start from the hip bone on slice B-1 of FIG. 5.
Repetitively increase the Y (height) coordinate of the
  hip bone, while keeping the X (length)
  coordinate constant,
  Until the Z (distance) coordinate increases by at
    least two inches between two consecutive X
    coordinates. The back of the animal has been
    reached.

Use the pseudo code in Table 13 to follow the back of the animal until the perimeter of the animal drops far enough to know that the rear most point of the animal has been found. The pin bone is the rear most point on the cow, excluding the tail. The distance from the camera of the pin bone is compared with the hip bone and a rump angle is calculated and rated. The pseudo code for this is shown in Table 13.

TABLE 13

Continue along the back of the animal toward the rump using the pseudo code of Table 3 follow a line across the back and down the rump of the animal.
    As the edge is followed, save the X, Y, and Z coordinates of the point with the smallest X coordinate.
    Continue down the rump until the Y (height) coordinate is one foot lower than the Y coordinate at the top of the B-1 slice.
Use the coordinates with the smallest X (length) coordinate found while outlining the rump.
Repetitively increase the X (length) coordinate for four inches, keeping the Y (height) coordinate constant.
    Save all the Z (distance) coordinates in the four inches.
If the Z (distance) is decreased at least two inches between two consecutive X points along this Y (height) line, the smallest X coordinate was on the tail.
    Save the X, Y, and Z coordinates after the Z (distance) is decreased by at least two inches. This is the rear of the animal.
    Repetitively decrease the Y (height) coordinate,, varying the X (length) coordinate as needed to follow the line where the Z (distance) coordinate increases at least two inches between two consecutive X or Y coordinates. Continue this line until Y (height) is one foot lower than the back at the top of slice B-1 on FIG. 5.
    Save the X, Y, and Z coordinates at the smallest X (length) coordinate along this line.
End If.
The coordinates at the smallest X location, not on the tail, identify the pin bone B-4 on FIG. 5, and rear of the animal.
Using the X (length) and Y (height) coordinates of the pin bone and the hip bone, calculate the angle of a line from the hip bone to the pin bone. Level or a slight slope down from the hip bone to the pin bone is best.

The thurl bone is used to calculate linear width of the rump of the animal. The thurl bone is closest to the camera on the B-3 slice in Screen B of FIG. 5. This bone is roughly in the center of Screen B on FIG. 5. The pseudo code in Table 14 finds the thurl bone and calculates the linear width of the animal.

TABLE 14

Define a center square in Screen B of FIG. 5.
The top of the center square is one third of the way from the hip bone to the bottom of Screen B on the Y axis. Save this Y coordinate.
The bottom of the center square is two thirds of the way from the hip bone to the bottom of Screen B on the Y axis. Save this Y coordinate.
The left side of the center square is one third of the way from the pin bone to the hip bone on the X axis. Save this X coordinate.
The right side of the center square is two thirds of the way from the pin bone to the hip bone on the X axis. save this X coordinate.
Start in the lower left corner of the center square, the location with the lowest X and Y coordinates in the center square.
Repetitively increase Y (height), while keeping X (length) constant,
    Until the top of the center square is reached.
    Save the X, Y, and Z coordinates of the point with the smallest Z value. The point closest to the camera.
Increase the X (length) coordinate and use the Y (height) coordinate of the bottom of the center square.

TABLE 14-continued

After all the Z values in the center square have been checked, the X, Y, and Z coordinates of the smallest Z value found indicate the location of the thurl bone. If there is more than one point with the same Z (distance) coordinate, use the point nearest the center of this center square in Screen B of FIG. 5.
Start from the thurl bone.
Repetitively increase the Y (height) coordinate of the thurl bone, while keeping the X (length) coordinate constant,
    Until the Z (distance) coordinate increases by at least 2% over the last Z coordinate between two consecutive Y (height) coordinates. The back of the animal has been reached, and the top of the B-3 slice of FIG. 5 has been identified.
Subtract the Z (distance) coordinate of the thurl bone from the Z coordinate of the top of the B-3 slice. Multiply this distance by two. This gives the linear width of the rump of this animal. Compare this to an optimum width to rate this animal.

All the needed slices on Screen B have been identified and evaluated. Return to the hip bone on slice B-1 in Screen B of FIG. 5 to begin evaluating Screen C. Screen C extends from the hip bone to the rear of the animal, and from the lines defined in Table 11 between Screen B and Screen C and between Screen C and Screen D. Screen C is used to evaluate the mammary system of the animal. Beginning from the hip bone on B-1 in FIG. 5 locate the udder and the teats of the animal.

TABLE 15

The C-1 slice on FIG. 5 starts from the Y (height) coordinate of the line between Screen B and Screen C. The X (length) coordinate is the value of X at the hip bone.
Repetitively decrease the Y (height) coordinate, keeping X (length) constant,
    Until the Z (distance) coordinate increases by at least 2% over the last Z coordinate between two consecutive Y (height) coordinates.
Increase Y (height) by one to return to the animal.
Save the X, Y, and Z coordinates at the bottom of the C-1 slice.

Then determine the length of first teat found. The pseudo code in Table 16 evaluates Screen C on FIG. 5. Starting from the bottom of the C-1 slice as located by the pseudo code of Table 15 and follow the edge of the animal watching for a change of half an inch in Y within one quarter inch in X. The first teat has been found. Measure the length of the teat for rating. Immediately after the first teat, slice C-6 is identified. The bottom of the C-6 slice is compared to the backbone and the ground to rate the udder depth of this animal.

TABLE 16

Repetitively decrease the X (length) coordinate varying the Y (height) coordinate as needed to follow a line along the bottom of the cow where the Z (distance) coordinate increases by at least 2% between two consecutive X or Y coordinates. (This logic is very similar to the logic used in Table 3.)
When the Y (height) coordinate decreases by at least half an inch within one quarter inch change in X (length), the first teat has been found.
Save the X, Y, and Z coordinates of the point on the udder before starting down the teat.
Continue to decrease the Y (height) coordinates, TABLE 16-continued varying the X (length) coordinate as needed to
follow the edge of the animal, until Y
increases to at least half the distance
between the lowest point on the teat and the
starting point of the teat.
Saving the X, Y, and Z coordinates at the lowest Y
coordinate.
Calculate the height difference between the staring
point of the teat and the lowest point on the
teat to determine the length of the teat.
Compare the teat length to the optimum teat
length and record a rating for the current
animal.
Continue to increase the Y (height) coordinate, varying
the X (length) coordinate, until the X
(length) coordinate decreases by at least one
quarter inch within one quarter inch change in
Y (height), the udder behind the first teat
has been found.
Save the X, Y, and Z coordinates of the point on
the udder as the bottom of the C-6 slice.
Repetitively decrease the X (length) coordinate varying
the Y (height) coordinate as needed to follow
the edge along the bottom of the cow.
Until the Z (distance) coordinate decreases by at
least 2% of the last Z coordinate between two
consecutive X (length) coordinates. The hind
leg has been reached.
Saving the X, Y, and Z coordinates at the start of
the hind leg.

The measurements of Screen C FIG. 5 are completed. More mammary measurements are taken from FIG. 7.

Screen D provides hoof and leg angel measurement for the current animal. If the angle of the leg to the ground is too perpendicular or too slopping, this causes other problems with this animal. The points down the front of the near hind leg were located just prior to table 11. Use Table 3 to move back up the front of the near hind leg two inches. Start from the bottom of the D-1 slice, the Y coordinate is predominantly increased and the X coordinate is predominantly decreased, until the Y coordinate is two inches above the ground level.

Table 17 moves across the near hind leg.

TABLE 17

Repetitively decrease the X (length) coordinate while
keeping the Y (height) coordinate constant,
Until the Z (distance) coordinate increases by at
least 1% over the last Z coordinate between
two consecutive X (length) coordinates. The
distance off the leg may be less here, because
of the closeness to the ground. The back of
the hind leg has been reached.
Increase the X (length) coordinate by one to return to
the animal.

Use Table 3 to follow the edge of the back of the near hind leg to the ground to get the points needed to evaluate the angle of the hind leg. Start from the point on the back of the near hind leg found in Table 17, the Y coordinate is predominantly reduced and the X coordinate is predominantly increased until the edge of the animal can no longer be identified. Save the last point on the animal as the bottom of the D-4 slice in Screen D of FIG. 5. Table 18 uses the points on the front and back of the near hind leg to evaluates the angle of the hind leg.

TABLE 18

Start from the bottom of D-4.
Repetitively increase Y (height) coordinate while
keeping the X (length) coordinate constant, TABLE 18-continued Until the Z (distance) coordinate changes by two
inches between two consecutive points.
Decrease the Y (height) coordinate by one to get the
last point still on the animal.
Save these X, Y, and Z coordinates as the top of the D-4
slice on FIG. 5.
Call Table 3 to follow a line up the back of the near
hind leg. Start from the bottom of the D-4
slice, the (height) coordinate is
predominantly increased and the X (length)
coordinate is predominantly reduced, until the
Y coordinate is one foot above the Y value at
the bottom of D-4.
Save the X, Y. and Z coordinates of this point as
the top of the D-7 slice.
Calculate the leg angle from the ground at the bottom of
the D-1 slice and the top of the D-7 slice in
FIG. 5 and give it a rating.
Calculate the hoof angle from the ground at the bottom
of the D-1 slice and the top of the D-4 slice
in FIG. 5 and give it a rating.

All the feature of FIG. 5 have been evaluated now.

Figure 7:
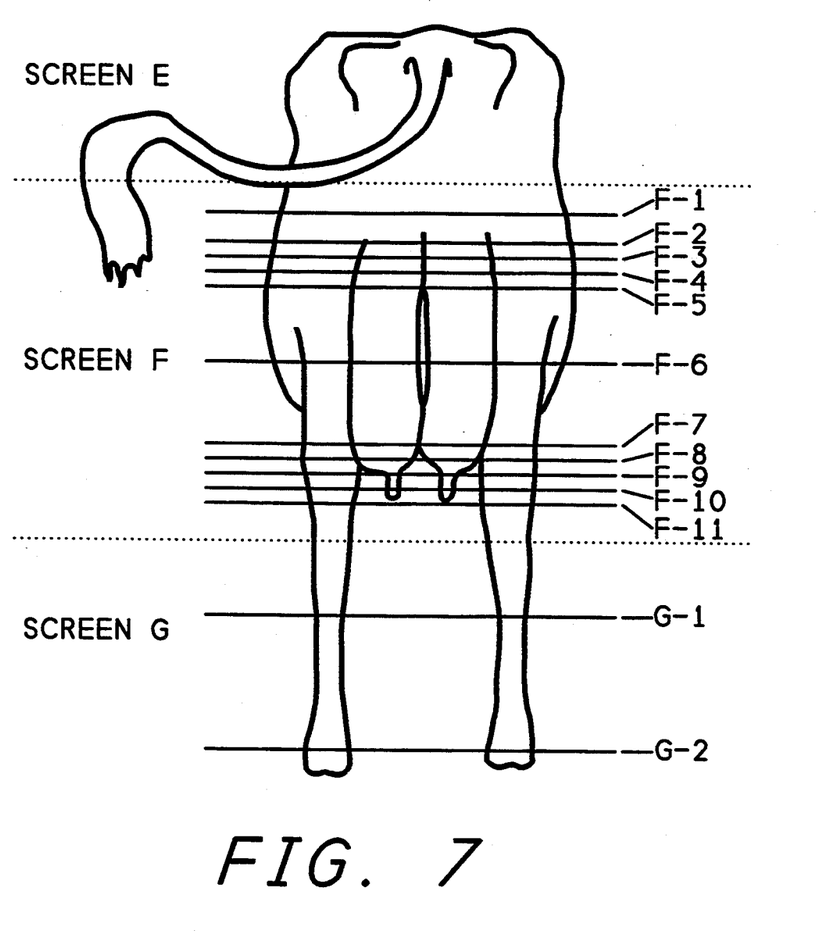
FIG. 7 shows a rear view of an animal indicating points to be located.

Referring now to FIG. 7, a rear view of the cow as it would be seen by a second laser camera placed behind the cow. FIG. 7 is divided into three areas, Screens E, F, and G. Screen E and Screen G do not contain any evaluation points. Screen F contains the mammary system as seen from the rear.

A point at the top center of the udder is manually designated using a tracer beam, mouse, or other pointer on the computer in the same manner as the hip bone was designated above. This is the primary reference point for this view of the animal. This point is used to position each animal's image uniformly 10 feet from the camera. This way all animals can be consistently compared. If the reference point is not 10 feet from the camera, the whole image of the animal is appropriately adjusted, as shown in Table 19.

TABLE 19

If the top center point of the udder, the center of the
F-2 slice in FIG. 7, is less than 10 feet from
the laser camera 132 in FIG. 1,
    increase the distance, the Z coordinate, by the
        difference between the top center of the udder
        and 10 feet;
    increase all the other distance coordinates in the
        image by the difference between the top center
        point of the udder and 10 feet;
    then adjust all the X (horizontal length) and Y
        (vertical height) coordinates appropriately to
        reduce the image;
else, if the top center point of the udder, the center
    of the F-2 slice in FIG. 7 is more than 10
    feet from the camera 132 in FIG. 1,
    decrease the distance, the Z coordinate, by the
        difference between the top center point of the
        udder and 10 feet;
    decrease all the other distance coordinates in the
        image by the difference between the top center
        point of the udder and 10 feet;
    then adjust all the X (length) and Y (height)
        coordinates appropriately to enlarge the image
End If.
Save the coordinates of the top center point on the
    udder on slice F-2 of FIG. 7 for later use.

After the image of the cow is scaled to the desired size and distance, the location of measurement points are determined. The line between Screen E and Screen F occurs four inches above the manually designated top center point on the udder on slice F-2 of FIG. 7.

The line between Screen F and Screen G is half the distance to the ground. The ground and the width of the animal are determined by locating the right side of the cow and following a line down the side of the cow to the ground using the pseudo code of table 3 above. Following, Table 20, contains the pseudo code to find the left and right sides of the animal on the F-2 slice.

TABLE 20

Start from the top center point on the udder on slice F-2 of FIG. 7.
Repetitively decrease the X (length) coordinate while keeping the Y (height) coordinate constant,
Until the Z (distance) coordinate increases by at least 2% over the last Z coordinate between two consecutive X (length) coordinates. This is the left side of the F-2 slice on FIG. 7.
Save the X, Y, and Z coordinates of the left side of the F-2 slice.
Return to the top center point on the udder on slice F-2 of FIG. 7.
Repetitively increase the X (length) coordinate while keeping the Y (height) coordinate constant,
Until the Z (distance) coordinate increases by at least 2% over the last Z coordinate between two consecutive X (length) coordinates. This is the right side of the F-2 slice on FIG. 7.
Save the X, Y, and Z coordinates of the right side of the F-2 slice.

Use Table 3 to locate the ground by going down the right side of the animal. Start from the right side of the F-2 slice, the Y coordinate is predominantly reduced and the X coordinate varies, until the edge of the animal can no longer be identified. The ground and the right side of the G-2 slice has been found.

Calculate the line between Screen F and Screen G as half the distance from F-2 to the ground.

TABLE 21

Calculate the distance between the Y coordinates of the F-2 slice and the ground at G-2. Then calculate 50% of this distance as the location of the line between Screen F and Screen G.

In order to locate the bottom of the udder follow the line up the inside of the right hind leg. Locate the starting point of the udder, when the Y coordinate on the perimeter of the cow starts to move down. Save the starting point of the side of the udder and continue across the bottom of the udder. Save the bottom point of the udder to determine the depth of the udder. Table 22 contains the pseudo code to outline the inside of the animal's right hind leg and the bottom of the udder. The code to follow the edge of the animal would be similar to Table 3, but the points kept along the way are different and the terminating conditions are different.

TABLE 22

Start from the right side of the G-2 slice.
Repetitively increase the Y (height) coordinate while varying the X (length) coordinate along a line where the Z (distance) coordinate increases by at least 2% over the last Z coordinate between two consecutive X coordinates.
Until the Y (height) coordinate is two inches above the ground.
Repetitively decrease the X (length) coordinate while keeping the Y coordinate constant,
Until the Z (distance) coordinate increases by at least 2% over the last Z coordinate between two consecutive X (length) coordinates. The inside of the right hind leg has been located.
Repetitively increase the Y (height) coordinate while varying the X (length) coordinate along a line where the Z (distance) coordinate increases by at least 2% between two consecutive X coordinates.

TABLE 22-continued

Until the Y (height) coordinate is at least one inch lower than the highest Y point reached. The udder has been reached.
Save the X, Y, and Z coordinates of the highest Y point reached. This is the udder connection with the right hind leg of the animal.

Various points along the udder need to be identified. The lowest point on the udder, not including a teat, is needed to determine the depth of the udder. This point is also used to locate the F-6 slice in Screen F of FIG. 7 that is used for udder width measurements and rating. The pseudo code for all this is shown in Table 23.

TABLE 23

Start from the udder connection to the right hind leg.
Repetitively decrease the X (length) coordinate, while varying the Y (height) coordinate as needed, along a line where the Z (distance) coordinate increases by at least 2% between two consecutive Y coordinates.
Until the Y (height) coordinate decreases by at least half an inch within one quarter inch along the X axis. A teat has been reached. Save this point for use later.
Increase the Y (height) coordinate by one half inch and save the Y coordinate as the height of the F-9 slice in Screen F in FIG. 7.
Calculate the distance between the Y coordinates of the F-2 slice and F-9 slice. Then calculate 50% of this distance as the location of the F-6 slice. Slice F-6 on FIG. 7 occurs half way between slice F-2 and slice F-9.
Beginning with the X (length) coordinate of the top center point on the udder on slice F-2 of FIG. 7 and the F-6 Y (height) coordinate, keep the Y coordinate constant and increase the X coordinate until the Z (distance) coordinate increases by at least 2% over the last Z coordinate between two consecutive X coordinates.
While moving across the rear of the cow, and after moving two inches on the X axis, save the X (length) coordinate and the Z (distance) coordinate at the point where the Z coordinate is furthest from the camera, but still on the animal. This identifies the crease on the right side of the udder.
Return to the X (length) coordinate of the top center point on the udder on slice F-2 of FIG. 7 and the F-6 Y (height) coordinate, keep the Y coordinate constant and decrease the X coordinate until the Z (distance) coordinate increases by at least 2% between two consecutive X coordinates.
While moving across the rear of the cow, and after moving two inches on the X axis, save the X (length) coordinate and the Z (distance) coordinate at the point where the Z coordinate is furthest from the camera, but still on the animal. This identifies the crease on the left side of the udder.
The distance between the left side of the udder and the right side of the udder on F-6 slice of FIG. 7 defines and rates the width of the rear of the udder.

The lowest point on a teat is needed, and the location and height of the cleft between the two sides of the udder is needed. All these points are located in the following pseudo code, Table 24.

TABLE 24

Staring from the point where the first rear teat was identified in table 23.
Repetitively decrease the Y (height) coordinate, while varying the X (length) coordinate as needed, along a line where the Z (distance) coordinate TABLE 24-continued

```
    increases by at least 2% between two
    consecutive X coordinates.
  Save the lowest Y (height) coordinate reached.
  Until the Y (height) coordinate increases by half
    an inch within one quarter inch decrease along
    the X coordinate.
  Save the lowest Y (height) coordinate as the height of
    the F-11 slice on FIG. 7.
  Repetitively decrease the X (length) coordinate, while
    varying the Y (height) coordinate as needed,
    along a line where the Z (distance coordinate
    increases by at least 2% between two
    consecutive X coordinates.
  Save the X, and Y coordinates of the highest point
    reached by the Y coordinate.
  Until the Y (height) coordinate decreases by at
    least one inch within one inch along the X
    axis. The highest point defines the height of
    the F-7 slice on FIG. 7, and the udder cleft.
    Save the X and Y coordinates of this point.
  Beginning with the X (length) coordinate of the top
    center point on the udder on slice F-2 of FIG.
    7 and the F-9 Y (height) coordinate, keep the
    Y coordinate constant and increase the X
    coordinate until the Z (distance) coordinate
    increases by at least 1% within three inches
    along the X coordinates. The most distant Z
    coordinate marks the inside of the right udder
    on the F-9 slice.
  Return to the X (length) coordinate of the top center
    point on the udder on slice F-2 of FIG. 7 and
    the F-9 Y (height) coordinate, keep the Y
    coordinate constant and decrease the X
    coordinate until the Z (distance) coordinate
    increases by at least 1% within three inches
    along the X coordinates. The most distant Z
    coordinate marks the inside of the left udder
    on the F-9 slice.
  The udder cleft on the F-7 slice in conjunction with the
    inside of the left and right udder define the
    triangular udder cleft of this cow.
  Compare this triangular udder cleft with the optimum cow
    and rate the current animal.
```

While the general inventive concepts and systems have been described in connection with illustrative and presently preferred embodiments thereof, it is intended that other embodiments of these general concepts and systems be included within the scope of the claims of this application and any patent issued therefrom. For example, the number of traits or phenotypic characteristics of animals and the manner and methods of determining such traits or characteristics may be expanded or contracted depending upon the purposes intended and the state of knowledge with respect thereto. It is contemplated that use of the present system will enable an enhanced knowledge with respect to the correlation between measurable characteristics and traits of animals and their offspring. While the general concepts and systems of the invention have been illustrated and described by reference to a particular kind of animal, i.e., dairy cow, it is to be understood and it is contemplated that the general concepts may be applied to other kinds of animals such as dogs, pigs, beef cattle, horses, chickens, etc. and human beings for any worthwhile purpose.

What is claimed is:

1. A system for measuring and rating the three-dimensional phenotypic conformation characteristics of an animal, the system comprising:
   means for creating a plurality of laser light signals directed toward the animal to reflect therefrom;
   image receiving means to receive the reflected laser light signals and provide three-dimensional and intensity image data for each of the reflected laser light signals; and
   computer means for receiving the three-dimensional and intensity image data, for selecting conformation points on the animal, for measuring linear and volummetric phenotypic conformation characteristics of the animal between the selected conformation points, and for comparing the linear and volummetric phenotypic conformation characteristics to predetermined linear and volummetric phenotypic conformation characteristics to provide the rating of the animal.

2. The system of claim 1 wherein the means for creating a plurality of laser light signals comprises laser camera means.

3. The system of claim 1 wherein the computer means further comprises means for storing the three-dimensional and intensity image data along with the linear phenotypic conformation characteristics wherein images of markings on the animal are stored for later identification.

4. The system of claim 1 wherein the computer means further comprises:
   means for storing the three-dimensional and intensity image data of the animal; and
   means for comparing the three-dimensional and intensity image data received from the animal to all three-dimensional and intensity image data stored during a predetermined previous amount of time and displaying an error indication if the comparing finds a match between the three-dimensional and intensity image data and previously stored three-dimensional and intensity image data for at least one previously measured animal, thereby indicating the animal has been previously measured during the predetermined previous amount of time.

5. The system of claim 1 further comprising:
   weighing means located under the animal and connected to the computer means for providing a weight of the animal to the computer means; and
   means within the computer means for storing the weight of the animal along with the linear phenotypic conformation characteristics.

6. The system of claim 1 wherein the computer means further comprises optical character recognition means for converting a portion of the three-dimensional and intensity image data containing an image of at least one symbol located on the animal into a computer processable identification value.

7. The system of claim 1 wherein the computer means further comprises means for computing, from the three-dimensional and intensity image data, a volume of at least one portion of the animal.

8. The system of claim 1 further comprising distance modifying means within the computer means for modifying distance information within each point of image data to thereby place the animal at a predetermined distance from the image receiving means.

9. The system of claim 8 wherein the distance modifying means further comprises:
   means for determining a first line between at least two selected points on the animal; and
   means for modifying distance information within each point of image data from the animal to cause the first line to be perpendicular to a second line between the means for creating a plurality of laser light beams and a center of the first line.

10. A system for measuring preselected three-dimensional physical characteristics of an animal to provide a rating for the animal, the system comprising:
- a laser camera aligned to project a plurality of laser light signals toward the animal, and aligned to receive reflected laser light signals from the animal to provide three-dimensional reflection location data for each of the laser light signals reflected from the animal; and
- a computer having a rating subsystem that receives the three-dimensional reflection location data, combines the three-dimensional reflection location data to measure the preselected three-dimensional physical characteristics of the animal, and compares the three-dimensional physical characteristics of the animal to predetermined three-dimensional physical characteristics to provide a rating for the animal.

11. The system of claim 10 wherein the computer further comprises a storage device for storing the three-dimensional reflection location data along with the three-dimensional physical characteristics wherein images of markings on the animal are stored for later identification.

12. The system of claim 10 wherein the computer further comprises:
- a storage device for storing the three-dimensional reflection location data; and
- a comparing subsystem within the computer for comparing the three-dimensional reflection location data to all laser light data stored during a predetermined previous amount of time, and a display system within the computer for displaying an error indication if a match occurs between the three-dimensional reflection location data and previously stored three-dimensional reflection location data for at least one previously measured animal, thereby indicating that the animal has been previously measured.

13. The system of claim 10 wherein the computer further comprises an optical character recognition system for converting a portion of the three-dimensional reflection location data containing an image of at least one symbol located on the animal into a computer processable identification value.

14. The system of claim 10 further comprising:
- a scale located under the animal and connected to the computer for providing an animal weight signal to the computer; and
- a storage device within the computer means for storing the animal weight signal along with the three-dimensional physical characteristics of the animal.

15. The system of claim 10 wherein the computer further comprises a volume measuring system for measuring, from the three-dimensional reflection location data, a volume of at least one portion of the animal.

16. The system of claim 10 wherein the computer further comprises a distance modifying subsystem for modifying distance information within each point of the three-dimensional reflection location data to place an image of the animal at a predetermined distance from the laser camera.

17. The system of claim 16 wherein the distance modifying subsystem further comprises:
- a line locating subsystem for determining a first line between at least two predetermined points on the animal; and
- a second distance alignment subsystem for aligning each point of the three-dimensional reflection location data from the animal to cause the first line to be perpendicular to a second line between the laser camera and a center of the first line.

18. A method for measuring preselected three-dimensional physical characteristics of an animal, the method comprising:
- (a) projecting a plurality of laser light signals toward the animal for reflection therefrom;
- (b) receiving reflected laser light signals containing three-dimensional reflection location data for each of the laser light signals reflecting from the animal, wherein the three-dimensional reflection location data comprises distance data, horizontal and vertical location data, and intensity data for each reflected laser light signal;
- (c) combining the three-dimensional reflection location data to measure the preselected three-dimensional physical characteristics of the animal; and
- (d) comparing the preselected three-dimensional physical characteristics to predetermined three-dimensional physical characteristic data to provide a rating for the animal.

19. The method of claim 18 further comprising the step of storing the three-dimensional reflection location data along with the three-dimensional physical characteristics wherein markings on the animal are stored for later identification.

20. The method of claim 18 wherein step (c) further comprises the step of weighing the animal and storing the weight resulting from the weighing along with the three-dimensional physical characteristics.

21. The method of claim 18 wherein step (c) further comprises the step of converting a portion of the three-dimensional reflection location data containing an image of at least one symbol located on the animal into a computer processable identification value.

22. The method of claim 18 wherein step (c) further comprises the step of measuring, from the three-dimensional reflection location data, a volume of at least one part of the animal.

23. The method of claim 18 wherein step (b) further comprises the steps of:
- (b1) storing the three-dimensional reflection location data;
- (b2) comparing the three-dimensional reflection location data from the animal to all three-dimensional reflection location data stored during a predetermined previous amount to time; and
- (b3) displaying an error if step (b2) finds a match between the three-dimensional reflection location data and previously stored three-dimensional reflection location data for at least one previously measured animal.

24. The method of claim 18 wherein step (b) further comprises the step of:
- (b1) aligning each point of three-dimensional reflection location data received to place an image of the animal at a predetermined distance from a point from which the laser light signals are projected.

25. The method of claim 24 wherein step (b1) further comprises the steps of:
- (b1a) determining a first line between at least two points within the three-dimensional reflection location data on the animal; and
- (b1b) aligning each point of the three-dimensional reflection location data from the animal to cause the first line to be perpendicular to a second line formed from the point of projecting the laser light signals to a center of the first line.

* * * * *